United States Patent Office 3,455,646
Patented July 15, 1969

3,455,646
METHOD OF SEPARATING YTTRIUM FROM
RARE EARTHS BY ION EXCHANGE
John R. Morton, St. Louis, Mich., assignor to Michigan
Chemical Corporation, St. Louis, Mich., a corporation
of Michigan
No Drawing. Filed Sept. 26, 1966, Ser. No. 581,692
Int. Cl. C22b 59/00
U.S. Cl. 23—23                                    9 Claims

ABSTRACT OF THE DISCLOSURE

A process for the separation of yttrium from mixtures of yttrium and rare earth metals by eluting the ions through the hydrogen form of a cation exchange resin with aqueous solutions of hydroxyethylethylenediaminetriacetic acid (HEDTA) and wherein the resin and elutrient solution are maintained at elevated temperatures in the range of about 32° to 95° C. is described. Under these process conditions yttrium metal ions are found to elute substantially in advance of neodymium the exact eluting position depending upon the temperature selected. High purity yttrium is produced by the process.

This invention relates to a process for the separation of yttrium from mixtures of yttrium and rare earth metals. More specifically this invention concerns a novel improvement in a process for separating yttrium ions from mixtures of yttrium ions and rare earth metal ions by means of cation exchange resins and a chelating agent.

Compounds of yttrium found in nature are generally found in association with compounds of the rare earth metals. The chemical behavior of yttrium is similar to that of the rare earth metals, causing the separation of yttrium in high purity from the rare earth metals to be difficult and costly. Increasing industrial importance of high purity yttrium increases the importance of improved processes for its separation from the naturally occurring mixtures in which it is found. The rare earth metal of atomic number 61 has not been found in the naturally occurring mixtures, it being found in the products resulting from the irradiation of uranium with neutrons. The expressions "rare earth metals" and "rare earth metal ions" as used herein, unless otherwise defined or limited, mean those which occur in nature, i.e., those of atomic numbers 57 through 60 and 62 through 71.

The best processes known to the art for the separation of yttrium and rare earth metals from one another are based on ion-exchange chromatography. An aqueous solution of the mixture of the metal ions is passed through a bed of a cation exchange resin during which operation the ions are sorbed by the resin. An elutrient, an aqueous solution of a suitable chelating agent is passed through the bed whereby the ions are repeatedly desorbed and resorbed at varying rates such that successive bands of the individual metal ions develop. As the aqueous solution emerges from the bed it can be collected fractionally so as to obtain fractions enriched in individual metal ions. The ion exchange process is usually carried out at room temperature.

One of the methods known to be useful for separating yttrium ions and rare earth metal ions from mixtures of these ions involves the use of ethylenediaminetetraacetic acid (EDTA) as the chelating agent. This is the subject of U.S. Patent 2,798,789. However, because this agent has a very low solubility in water, very large quantities of a very dilute solution of this chelating agent must be used as the elutrient. In order to overcome this disadvantage, the ion exchange resin through which the solution is passed is first converted to its copper ion form, the chelate of the EDTA and copper having a higher water solubility than the EDTA in its free acid form. This modification has obvious disadvantages. Before reuse, the ion exchange resin must be reconverted to its copper ion form. The EDTA effluent emerging from the bed is chelated with copper ion and the necessary removal of the copper from the EDTA before it can be reused is difficult and expensive. Other disadvantages of the use of EDTA as the chelating agent are known to those skilled in the art.

In another similar process for the separation of certain rare earth metal ions from mixtures of yttrium ions and rare earth metal ions, elution is carried out with an aqueous ammoniacal solution of hydroxyethylethylenediaminetriacetic acid (HEDTA) through a bed of ion exchange resin in its hydrogen form. This is the subject matter of U.S. Patent 2,956,858.

According to U.S. Patent 2,956,858, HEDTA is a useful chelating agent for isolating rare earth ions of atomic numbers 57 through 60 and is extremely effective in the separation of rare earth metal ions of atomic numbers 68 through 71 from mixtures of rare earth metal ions and yttrium ions. According to U.S. Patent 2,956,858, the use of HEDTA provides greater resolution of the heavier rare earth metal ions of atomic numbers 68 through 71 than does the use of EDTA. Other advantages over the use of EDTA are described. The use of HEDTA does not require the use of copper ions as is necessary with EDTA. The HEDTA can be recovered easily and in high yield and can be reused.

As will be illustrated in comparative Example I in this specification, elution of a mixture of yttrium ions and rare earth metal ions with aqueous solutions of HEDTA results in elution of yttrium ions only slightly in advance of neodymium ions and highly contaminated with neodymium ions. It will be apparent that, in order to separate yttrium ions in high purity and in good recovery from mixtures of yttrium ions and rare earth metal ions including neodymium by eluation with HEDTA, according to the methods known in the art, elution must be carried out through many band lengths and through a long bed of the cation exchange resin. This requirement seriously reduces the economy of the process. Thus, whereas U.S. Patent 2,956,858 describes a process for the separation of certain rare earth ions from one another, it does not describe a suitable process for the separation of yttrium ions in high purity, good recovery and good economy from mixtures of yttrium ions and rare earth metal ions, particularly neodymium.

It is an object of this invention to provide an improvement in the ion exchange process for the separation of yttrium ions from rare earth metal ions which overcomes many of the disadvantages inherent in the known processes.

It is an object of this invention to provide an improvement in the separation of yttrium ions from rare earth metal ions, particularly neodymium, by an ion exchange process involving hydroxyethylethylenediaminetriacetic acid (HEDTA) as the chelating agent.

It is a further object to provide an improvement in the separation of yttrium ions from mixtures of yttrium ions and rare earth metal ions by an ion exchange process whereby only one elution step with HEDTA is necessary to obtain a good, economical recovery of high purity yttrium.

Other objects may become apparent as this invention is described.

According to this invention, in the process for the separation of yttrium metal ions from any of the rare earth metal ions having atomic numbers 60 and less by providing for sorption of the mixture of the metal ions on the hydrogen form of a cation exchange resin, then eluting the metal ions through and from the cation exchange resin with an elutrient solution which comprises an aqueous solution of hydroxyethylethylenediaminetriacetic acid, and collecting successive fractions of effluent liquid, the objects of this invention are met by the improvement which comprises maintaining the ion exchange resin and the elutrient solution at an elevated temperature such that yttrium metal ions are eluted substantially in advance of neodymium. Specifically, the temperature of the ion exchange resin and the elutrient solution is maintained in the temperature range of from about 32° to 95° C., preferably about 40° to 95° C. When the process with the improvement is applied to the separation of mixtures which contain any of the rare earth metal ions having atomic numbers of 62 through 65, as well as any of those having atomic numbers of 60 and less, the preferred temperature range is 45°–50° C.

Any cation exchange resin containing sulfonic acid groups as the active group can be used in practicing this invention. Examples of such resins are sulfonated phenol-formaldehyde resins and sulfonated vinyl aromatic resins, e.g., sulfonated, water insoluble copolymers of a monovinyl aromatic hydrocarbon and a small amount of a divinyl aromatic hydrocarbon. Several such cation exchange resins known and available to the trade are: "Amberlite IR–120," "Nalcite HCR," "Dowex 50," and "Chempro C–20." For best operation of this invention, the cation exchange resin in its hydrogen form should swell appreciably in water such that the water-swollen resin granules contain from 40 to 80 percent, preferably 50 to 70 percent by weight of water. The cation exchange resin is employed in the form of granules or beads. Although the size of the resin granules or beads is not critical, a mesh size of between 25 and 100, as determined by U.S. Standard screens, is preferred. It is preferred that the resin is employed in its hydrogen form.

The feed solution which contains the yttrium and rare earth metal ions to be separated is acidic up to pH of about 6. At higher pH values, the rare earth ions begin to precipitate as insoluble hydroxides. The concentration of the yttrium and rare earth metal ions in the feed solution can vary quite widely. The preferred concentration is in the range of 2.0 to 5.0 percent, measured as $M_2O_3$ where M represents yttrium and rare earth metal.

The elution solution used in practicing this invention is an aqueous solution of a salt of hydroxyethylethylenediaminetriacetic acid. Examples of such salts are the HEDTA salts of the following cations: ammonium, sodium, potassium, lithium, calcium, magnesium, barium, lanthanum and the mono, di, and trimethyl and ethyl ammonium. The preferred eluting solution is an aqueous solution of an ammonium salt of HEDTA. Such solutions can be prepared by adding the hydroxide of the appropriate cation to an aqueous solution of the free HEDTA until one, two, or all three of the carboxylic acid groups are neutralized. The concentration of the HEDTA can vary quite widely from a very low concentration of about 1.0 gram per liter of solution (0.0036 molar) to a high concentration of about 8.0 grams per liter of solution (0.029 molar). Obviously, very low concentrations are uneconomical. For best operation of this invention, a concentration of about 4.0 to 6.0 grams of HEDTA per liter of solution (0.014 molar to 0.022 molar) is preferred.

Enough ammonia or hydroxide of the appropriate cation is added to neutralize the carboxylic acid groups of HEDTA to the desired point. The pH of the solution is a convenient measure of the degree of neutralization of the HEDTA. When an aqueous solution of an ammonium salt of HEDTA is used, it is prepared by adding ammonia to the aqueous solution of HEDTA until the desired pH is obtained. The pH of the elutrient can vary in the range from about 4.0 to about 8.0. At the preferred concentrations of HEDTA described above, the pH of the solution is adjusted with ammonia to within the range of about 6.0 to 7.0, but the preferred range is 6.3 to 6.7. Ammonia can be added either as anhydrous ammonia gas or as an aqueous solution of ammonia, for example, a 28 percent aqueous ammonia solution.

Another variable associated with this process is the rate of flow of the elutrient through the bed of ion exchange resin. Slow rates of flow sometimes provide more effective separations of the metal ions but are often wasteful of time. Excessively rapid rates of flow do not provide effective separations of the ions. When this invention is practiced with the preferred ranges of other variables, the preferred range of the rate of flow of the elutrient is about 2.0 to 5.3 milliliters per cm.$^2$ per minute.

Still another variable associated with this process is the number of band lengths through which the elution is carried. A small number provides inferior separation of the ions; use of an excessive number of band lengths is not economical. In order to achieve equilibrium when the preferred ranges of other variables are used, it is necessary that elution be carried through at least about 1.5 band lengths. However, economic separation of high purity yttrium can be achieved with a long band which has not been eluted to equilibrium. It is preferred that elution be carried through at least one band length.

Other obvious variables are the number and size of the columns or beds containing the cation exchange resin. The ranges of variables described hereinbefore are based on the use of columns described in detail in Examples I and II. If columns of different sizes and numbers are used, some modifications in the other variables are possible. These are not to be considered as outside of the scope and spirit of this invention.

Those skilled in the art will recognize that the process with its improvement is preferably performed in a continuous manner. The cation exchange resin is contained within a series of several columns, the size and number of which depend in part on the composition of the feed solution, the degree of separation sought and the rate of productivity of purified materials. When a plurality of columns are used, the columns are connected in series, enabling the solution to flow into the top of a column and thence from the bottom of that column into the top of the next column in the series. In theory the reverse direction of flow can also be used. In practice however, the resin bed becomes fluidized unless the bed is tightly restricted. This behavior can affect the separation adversely.

All of the variables referred to are interdependent to some degree. Therefore those skilled in the art will recognize many modifications. These are not to be considered as outside of the scope and spirit of this invention.

The following is a general description of the procedure used for the separation of ions by the ion exchange process. The series of columns containing the ion exchange resin is prepared. The ion exchange resin is converted to its hydrogen form by passing a dilute solution of a mineral acid such as sulfuric acid through the resin. Excess acid is washed out of the columns. The feed solution is then passed into the first column or the first few of the series of columns. The eluting solution containing the HEDTA salt is then passed into the first column, the flow continuing through the entire series of columns at a chosen rate of flow. Effluent solution emerging from the last column is collected fractionally and each fraction is analyzed. Those fractions having the desired metal ion in the desired purity can be processed in one or more ways known to the art so as to obtain the metal or a compound of the metal. Generally the metal ion is precipitated as its oxalate salt and ignited to form the metal oxide. The process by which the metal ion is removed from solution is not critical to this invention.

Comparative Example I is a specific description of the process of the prior art whereby yttrium and rare metal ions are separated from one another by means of ion exchange principles and wherein elution is performed at room temperature. The comparative example is included in order to show that some separation can be obtained.

It will also show that, although yttrium can be separated to some extent, the process of the prior art does not provide a good recovery of high purity yttrium.

COMPARATIVE EXAMPLE I

The cation exchange resin used in this example was "Amberlite IR-120" resin, a sulfonated copolymer of styrene and divinylbenzene, approximately eight percent crosslinked. The resin had a particle size of 30–40 mesh as determined by U.S. Standard sieves. Each of nine columns, 2⅜ inches diameter, was loaded with 44 to 48 inches of the resin. The first three of the nine columns were used as feed columns, the remaining six were used to perform the separation. The bottom outlet of each column was connected to the inlet at the top of the next succeeding column by means of plastic tubing having a 0.25 inch inner diameter, however, the connection between the third and fourth columns not being made until the feed solution had been loaded on the first three columns. The bottom outlet of the final column was connected by plastic tubing to a delivery point about ten feet above the bottom outlet. The filled columns were back-washed with water to provide uniform beds.

An yttrium-rare earth concentrate used to prepare the feed solution in this example was a concentrate known to contain 60–65 percent yttrium oxide, 25–35 percent of oxides of rare earth metals of atomic numbers 66 to 71 and 5–10 percent of oxides of rare earth metals of atomic numbers 57–65. Eleven hundred grams of the concentrate was dissolved in about thirty percent excess of 37 percent hydrochloric acid which had previously been heated to 80° C. After the concentrate had dissolved, the solution was diluted to five gallons and filtered through glass wool. This feed solution was passed into the first three columns, the feed columns. Excess acid and excess feed were washed out of the feed columns by passing water through the columns. The connection between the third and fourth columns was then made complete.

The HEDTA elutrient was an aqueous solution having a concentration of 5.0 grams of HEDTA in a liter of solution and adjusted to pH 6.5 with 28 percent aqueous ammonia. The elutrient was passed into the first column and on through the series of columns by means of a suitable uniform pumping system. A flow control valve and a flow meter in the flow line between the pump and the inlet to the first column were used to control the rate of flow of the elutrient at about 2.66 ml. per cm.² per minute.

When effluent solution emerging from the last column was found to contain metal ions, the effluent was collected fractionally. Each fraction was analyzed to determine the quantity of each metal ion present in the fraction. The methods of analysis used will be known to those skilled in the art. Oxalic acid was added to the fraction of effluent to precipitate the oxalate salts of the yttrium and rare earth metals present. The precipitate was filtered, dried, and fired at high temperature to convert the metal oxalate to the corresponding metal oxide. The metal oxide was analyzed either by means of an emission spectrograph or a fluorescent X-ray spectrometer.

Under these conditions elution was carried through 1.84 band lengths. The results of analysis of each of the fractions collected are given in Table I. Of the total amount of yttrium present in the feed columns prior to elution, 79.3 percent was recovered. In Table I, those fractions identified by an asterisk (*) were analyzed with an emission spectrograph and these results are given as parts per million (p.p.m.) unless otherwise stated in the table. "M" designates a major constituent, i.e., one present in amount greater than about 10 percent. One exception is that analysis for neodymium was in all instances done with a fluorescent X-ray spectrometer and the results expressed as percent by weight. All other analyses were done by the fluorescent X-ray spectrometer and the results expressed as percent by weight.

TABLE I.—ANALYSIS OF FRACTIONS FROM EXAMPLE I

| Fraction | Lu | Yb | Tm | Er | Ho | Dy | Tb | Gd | Eu | Sm | Y | Nd | Pr | Ce | La | Frac. Wt., g. | Wt., g. Y₂O₃ |
|---|---|---|---|---|---|---|---|---|---|---|---|---|---|---|---|---|---|
| 1 | 8.0 | 80 | 5.9 | 4.5 | <1 | <1 | | | | | | | | | | 19.5 | |
| 2 | 3.4 | 43 | 12 | 35 | 1.6 | 2.4 | <1 | <1 | | | | | | | | 30.2 | |
| 3 | x | 7.5 | 8.2 | 64 | x | 12 | 2.0 | 1.4 | | <1 | | | | | | 30.0 | |
| 4 | | 1.9 | 4.2 | 49 | | 27 | 4.4 | 3.9 | | 1.5 | | | | | | 33.8 | |
| 5 | | x | x | 25 | | 42 | 6.8 | 8.4 | | 2.7 | | | | | | 32.0 | |
| 6 | | | | 12 | | 46 | 7.7 | 14 | | 4.6 | <1 | | | | | 29.9 | |
| 7 | | | | 5.3 | | 48 | 8.0 | 18 | | 6.6 | 1.3 | | | | | 32.2 | 0.3 |
| 8 | | | | 2.5 | | 37 | 6.4 | 20 | | 7.8 | 22 | | | | | 28.0 | 6.2 |
| 9 | | | | <1 | | 4.6 | 1.2 | 4.6 | | 2.5 | 86 | | | | | 19.1 | 16.4 |
| *10 | | 10–100 | | 100 | ~500 | 1,210 | 98 | 4,700 | 500–1,000 | | M | <1% | | | | 18.2 | 18.0 |
| *11 | | 100 | | | ~500 | 750 | <100 | 490 | | | M | <1% | | | | 19.2 | 19.0 |
| *12 | | 10–100 | | | 50–100 | 108 | | 90 | | | M | <1% | | | | 17.8 | 17.6 |
| 13 | | | | | | | | | | | 99 | <1 | | | | 19.0 | 18.8 |
| 14 | | | | | | | | | | | 99 | <1 | | | | 19.2 | 19.0 |
| *15 | | 10–100 | | | 100 | 475 | <100 | 345 | | | M | <1% | | | | 18.6 | 18.4 |
| 16 | | | | | | | | | | | 99 | <1 | | | | 19.6 | 19.4 |
| 17 | | | | | | | | | | | 99 | <1 | | | | 18.3 | 18.1 |
| *18 | | 10 | | | ~50 | <50 | | | | | M | <1% | | | | 19.1 | 18.9 |
| 19 | | | | | | | | | | | 99 | <1 | | | | 18.4 | 18.2 |
| 20 | | | | | | | | | | | 99 | <1 | | | | 19.1 | 18.9 |
| *21 | | 10 | | | 50–100 | 71 | | 29 | | | M | <1% | | | | 18.6 | 18.4 |
| *22 | | 10–100 | | | | <50 | | <20 | | | M | <1% | | | | 17.0 | 16.8 |
| *23 | | 0 | | | | <50 | | <20 | | | M | <1% | | | | 19.0 | 18.8 |
| *24 | | 10 | | | | | | <20 | | | M | 1.1% | | | | 15.1 | 14.9 |
| 25 | | | | | | | | | | | 98 | 1.2 | | | | 18.6 | 18.2 |
| 26 | | | | | | | | | | | 98 | 1.3 | | | | 15.6 | 15.2 |
| 27 | | | | | | | | | | | 97 | 1.5 | | | | 18.0 | 17.5 |
| 28 | | | | | | | | | | | 97 | 1.7 | | | | 18.7 | 18.1 |
| 29 | | | | | | | | | | | 96 | 2.0 | | | | 18.0 | 17.3 |
| 30 | | | | | | | | | | | 96 | 2.1 | | | | 16.7 | 16.0 |
| 31 | | | | | | | | | | | 95 | 2.4 | | <1 | | 19.1 | 18.2 |
| 32 | | | | | | | | | | | 95 | 2.8 | <1 | 2.1 | <1 | 18.6 | 17.7 |
| 33 | | | | | | | | | | | 78 | 2.4 | 3.5 | 18 | 4.3 | 20.0 | 15.6 |
| 34 | | | | | | | | | | | 23 | <1 | 2.2 | <1 | 33 | 12.7 | 2.9 |

It can be seen from Table I that in Comparative Example I yttrium was eluted from the columns between samarium and neodymium, but only slightly in advance of neodymium. All of the fractions which were composed predominantly of yttrium ions were contaminated to at least some extent with neodymium. Furthermore, those fractions containing yttrium ions not contaminated with rare earth ions of atomic numbers of 62 through 71 were contaminated with significant amounts of neodymium. Thus, the process of the prior art, of which Comparative Example I is illustrative, is not suitable for obtaining a good separation of yttrium ions from mixtures containing yttrium ions and rare earth metal ions, in particular the separation of yttrium ions from neodymium ions. Those skilled in the art will observe that elution through many more than 1.84 band lengths would be necessary to obtain a good separation of yttrium ions from neodymium ions. This seriously affects the economic value of the process.

Examples II, III, and IV will demonstrate the manner in which this invention is used to improve the separation of yttrium ions from mixtures of yttrium ions and rare earth metal ions, particularly neodymium and those of lesser atomic number.

EXAMPLE II

Two glass columns, two inches inner diameter and sixty inches long were each loaded with 3000 ml. of the "Amberlite IR-120" cation exchange resin described in Comparative Example I having a 30–40 mesh particle size as determined by U.S. Standard sieves. The resin in the columns was back-washed to provide uniform beds. These two columns were used as feed columns. The bottom outlet of the column used as the first column of the series was connected by 0.25 inch inner diameter plastic tubing to the inlet at the top of the second column.

The yttrium-rare earth feed solution was prepared from a chloride solution of yttrium ions and rare earth ions the concentration of which was 22.1 percent $M_2O_3$ where M designates yttrium and rare earth. The yttrium content of the $M_2O_3$ was 65.6 percent. A 2,260-gram portion of this solution was diluted to seven liters with deionized water. This feed solution thus had a concentration of 3.2 weight percent of $M_2O_3$.

The feed solution was passed through the two feed columns. Excess feed was washed out of the feed columns, and the excess metal ions were precipitated and ignited to the oxides for reuse.

Four columns to be used as the separation columns were prepared as were the feed columns. After being back-washed with water to provide uniform beds, the cation exchange resin was converted to the hydrogen ion form by passing five liters of 2 normal hydrochloric acid through each column. Excess acid was washed out of the columns with deionized water.

The feed columns and the four separation columns were placed in a small, suitably insulated cabinet in which, with appropriate heating devices and thermostatic controls, the temperature of the columns and their contents were maintained at 90°–95° C. The bottom outlet of the second feed column was connected to the inlet at the top of the first separation column. The other separation columns were similarly connected in series. The bottom outlet of the final separation column was connected to a delivery point about ten feet above the outlet of the column. The connections were made with 0.25 inch inner diameter plastic tubing.

The elutrient was a 5.0 gram per liter (0.018 molar) aqueous solution of HEDTA to which sufficient aqueous ammonia (28%) was added to adjust its pH to 6.5. As it was used, the elutrient was freed of dissolved air by passage through a suitable deaerator. A pump and a surge tank were employed to provide a steady, uniform flow of elutrient into the columns. A flow control valve and a flow meter in the line between the pumping system and the first feed column were used to control the rate of flow of elutrient.

After the columns had been brought to thermal equilibrium at 90°–95° C. in the cabinet, the flow of elutrient was started and maintained at 2.66 milliliters per cm.$^2$ per minute. After about eight days, when rare earth ions were found emerging from the columns, the effluent was collected in fractions. The metal ions in each fraction were precipitated as their oxalate salts which were filtered, ignited to their oxides and the oxides were analyzed. The results of the analysis of each fraction are presented in Table II.

TABLE II.—ANALYSIS OF FRACTIONS FROM EXAMPLE II

| Fraction | Lu | Yb | Tm | Er | Ho | Dy | Tb | Y | Gd | Eu | Sm | Nd | Pr | Ce | La | Frac. Wt., g. | Wt., g. $Y_2O_3$ |
|---|---|---|---|---|---|---|---|---|---|---|---|---|---|---|---|---|---|
| 1 | 27 | 74 | 2.0 | <1 | | | | | | | | | | | | 10.9 | |
| 2 | 3.7 | 85 | 9.4 | 8.8 | | | | | | | | | | | | 12.2 | |
| 3 | <1 | 52 | 24 | 38 | | | | | | | | | | | | 10.9 | |
| 4 | | 1.4 | 4.1 | 99 | <1 | <1 | | | | | | | | | | 10.9 | |
| 5 | | <1 | <1 | 86 | 9.2 | 1.5 | | | | | | | | | | 10.2 | |
| 6 | | | | 28 | 56 | 26 | | | | | | | | | | 11.4 | |
| 7 | | | | <1 | 15 | 98 | | <1 | | | | | | | | 13.4 | <0.1 |
| 8 | | | <1 | | | 99 | <1 | 2.4 | | | | | | | | 11.9 | 0.3 |
| 9 | | | | | | 71 | 5.4 | 31 | | | | | | | | 9.7 | 3.0 |
| 10 | | | | | | 6.0 | 7.4 | 89 | | | | | | | | 7.1 | 6.3 |
| 11 | | | | | | <1 | 4.4 | 96 | | | | | | | | 7.7 | 7.4 |
| 12 | | | | | | | 3.0 | 97 | | | | | | | | 7.1 | 6.9 |
| 13 | | | | | | | 2.4 | 98 | | | | | | | | 7.3 | 7.2 |
| 14 | | | | | | | 2.1 | 98 | | | | | | | | 7.8 | 7.6 |
| 15 | | | | | | | 2.0 | 98 | | | | | | | | 7.0 | 6.9 |
| 16 | | | | | | | 2.1 | 98 | | | | | | | | 6.6 | 6.5 |
| 17 | | | | | | | 2.4 | 98 | | | | | | | | 7.1 | 7.0 |
| 18 | | | | | | | 2.7 | 97 | | | | | | | | 7.3 | 7.2 |
| 19 | | | | | | | 2.6 | 97 | | | | | | | | 7.4 | 7.3 |
| 20 | | | | | | | 2.5 | 98 | | | | | | | | 7.3 | 7.2 |
| 21 | | | | | | | 2.7 | 97 | | | | | | | | 6.6 | 6.5 |
| 22 | | | | | | | 1.9 | 98 | | | | | | | | 6.8 | 6.7 |
| 23 | | | | | | | 2.0 | 98 | | | | | | | | 6.6 | 6.5 |
| 24 | | | | | | | 2.0 | 98 | | | | | | | | 7.3 | 7.2 |
| 25 | | | | | | | 2.0 | 98 | | | | | | | | 7.3 | 7.2 |
| 26 | | | | | | | 2.0 | 98 | | | | | | | | 7.2 | 7.1 |
| 27 | | | | | | | 2.0 | 98 | | | | | | | | 7.3 | 7.2 |
| 28 | | | | | | | 2.0 | 98 | | | | | | | | 6.6 | 6.5 |
| 29 | | | | | | | 1.9 | 98 | | | | | | | | 7.1 | 7.0 |
| 30 | | | | | | | 2.0 | 98 | | | | | | | | 6.8 | 6.7 |
| 31 | | 5 | | | | | >10K | 99.0 | 78 | | | | | | | 6.9 | 6.8 |
| 32 | | 5 | | | | | >10K | 99.0 | 77 | | | | | | | 6.8 | 6.7 |
| 33 | | 5 | | | | | 7,150 | 99.3 | 75 | | | | | | | 7.1 | 7.0 |
| 34 | | 5 | | | | | 8,000 | 99.2 | 82 | | | | | | | 6.7 | 6.6 |
| 35 | | 5 | | | | | 8,400 | 99.1 | 121 | | | | | | | 6.9 | 6.8 |
| 36 | | 5 | | | | | 8,100 | 99.2 | 136 | | | | | | | 6.8 | 6.7 |
| 37 | | 5 | | | | | 6,700 | 99.3 | 160 | | | | | | | 7.5 | 7.4 |
| 38 | | 5 | | | | | 6,800 | 99.3 | 183 | | | | | | | 7.1 | 7.0 |
| 39 | | 5 | | | | | 6,650 | 99.3 | 270 | | | | | | | 6.9 | 6.8 |
| 40 | | 5 | | | | | 5,800 | 99.4 | 300 | | | | | | | 6.8 | 6.7 |
| 41 | | 5 | | | | | 5,500 | 99.2 | 2,540 | 300 | 1,000 | 500 | | | 100 | 7.7 | 7.6 |
| 42 | | 5 | | | | | 4,700 | 99.3 | 2,175 | 300 | 1,000 | 500 | | | 100 | 6.6 | 6.5 |
| 43 | | 3 | | | | | 4,200 | 99.0 | 3,450 | 500 | 1,000 | 750 | | | 500 | 7.8 | 7.7 |
| 44 | | 3 | | | | | 4,200 | 99.3 | 2,540 | 300 | 750 | 300 | | | 50 | 7.6 | 7.5 |
| 45 | | 3 | | | | | 3,525 | 99.4 | 2,200 | 100 | | 100 | | | 50 | 6.7 | 6.6 |
| 46 | | 3 | | | | | 3,800 | 99.2 | 3,000 | 100 | 500 | 100 | | | 50 | 6.9 | 6.8 |
| 47 | | 1 | | | | | 2,650 | 99.4 | 2,750 | 100 | 750 | 100 | | | 75 | 6.2 | 6.1 |
| 48 | | 1 | | | | | 1,630 | 99.5 | 2,625 | 100 | 500 | 100 | | | 75 | 6.9 | 6.8 |
| 49 | | | | | | | | 98 | 2.0 | <1 | | | | | | 7.4 | 7.3 |
| 50 | | | | | | | | 84 | 18 | 1.2 | <1 | | | | | 8.0 | 6.7 |
| 51 | | | | | | | | 25 | 67 | 2.6 | 8.0 | <1 | | 1 | 1 | 10.0 | 2.5 |
| 52 | | | | | | | | 1.7 | 51 | 1.8 | 20 | 12 | <1 | 3.4 | 3.2 | 10.6 | 0.2 |
| 53 | | | | | | | | <1 | 5.4 | <1 | 7.0 | 44 | 6.2 | 18 | 10 | 7.7 | <0.1 |
| 54 | | | | | | | | | <1 | | <1 | 8.6 | 8.0 | 60 | 17 | 6.0 | |
| 55 | | | | | | | | | | | <1 | <1 | 86 | 25 | | 4.3 | |
| 56 | | | | | | | | | | | | | 74 | 37 | | 3.3 | |

In Table II, and in Tables III and IV which follow, the yttrium content is reported as weight percent of the total metals present as their oxides. In those fractions wherein the yttrium content is less than 99 percent, the contents of other metals present were determined by fluorescent X-ray spectrometry and their contents are expressed as weight percent. In those fractions wherein the yttrium content is 99 percent or greater, the contents of the other metals were determined by emission spectrography and are expressed as parts per million (p.p.m.). "K" designates 1000. "Int." designates that an element could not be analyzed because of interference by another element present in large amounts.

EXAMPLE III

In a manner substantially identical to that of Example II, the feed columns were loaded with yttrium-rare earth feed and eluted with the HEDTA solution, but in this example the elution was carried out at a temperature of 60°–65° C. Analytical results of each fraction are presented in Table III.

TABLE III.—ANALYSIS OF FRACTIONS FROM EXAMPLE III

| Fraction | Lu | Yb | Tm | Er | Ho | Dy | Tb | Gd | Eu | Sm | Y | Nd | Pr | Ce | La | Frac. Wt., g. | Wt., g. Y₂O₃ |
|---|---|---|---|---|---|---|---|---|---|---|---|---|---|---|---|---|---|
| 1 | 26 | 71 | <1 | | | | | | | | | | | | | 8.5 | |
| 2 | 9.2 | 90 | 1.6 | <1 | | | | | | | | | | | | 12.1 | |
| 3 | 2.3 | 77 | 16 | 8.6 | | | | | | | | | | | | 11.9 | |
| 4 | <1 | 18 | 24 | 63 | <1 | | | | | | | | | | | 11.5 | |
| 5 | | <1 | 9.0 | 86 | 2.1 | <1 | | | | | | | | | | 11.1 | |
| 6 | | | 4.0 | 72 | 17 | 5.8 | | | | | | | | | | 11.8 | |
| 7 | | | <1 | 24 | 32 | 42 | <1 | | | | | | | | | 11.6 | |
| 8 | | | 3.2 | 17 | 78 | 2.0 | <1 | | | | | | | | | 11.7 | |
| 9 | | | Int. | 6.0 | 85 | 9.0 | 1.1 | | <1 | <1 | | | | | | 11.6 | <0.1 |
| 10 | | | Int. | | 64 | 19 | 9.8 | | 2.7 | 9.4 | | | | | | 10.8 | 1.0 |
| 11 | | | | | 23 | 16 | 22 | Int. | 4.2 | | 45 | | | | | 8.8 | 4.0 |
| 12 | | | | | 2.6 | 4.4 | 19 | 3.3 | 2.5 | | 76 | | | | | 7.5 | 5.7 |
| 13 | | | | | <1 | <1 | 12 | 1.0 | 1.8 | | 89 | | | | | 7.0 | 6.2 |
| 14 | | | | | | | 8.4 | <1 | 1.5 | | 91 | | | | | 7.0 | 6.4 |
| 15 | | | | | | | 6.8 | | 1.2 | | 94 | | | | | 7.1 | 6.7 |
| 16 | | | | | | | 6.5 | | 1.1 | | 95 | | | | | 7.2 | 6.8 |
| 17 | | | | | | | 6.2 | | 1.2 | | 96 | | | | | 7.1 | 6.8 |
| 18 | | | | | | | 6.3 | | 1.3 | | 94 | | | | | 7.1 | 6.7 |
| 19 | | | | | | | 6.4 | | 1.3 | | 95 | | | | | 11.1 | 10.5 |
| 20 | | | | | | | 6.1 | | 1.3 | | 94 | | | | | 5.6 | 5.3 |
| 21 | | | | | | | 6.0 | | 1.4 | | 94 | | | | | 7.0 | 6.6 |
| 22 | | | | | | | 5.9 | | 1.5 | | 92 | | | | | 7.1 | 6.5 |
| 23 | | | | | | | 5.5 | | 1.5 | | 95 | | | | | 7.2 | 6.8 |
| 24 | | | | | | | 5.4 | | 1.6 | | 96 | | | | | 8.1 | 7.8 |
| 25 | | | | | | | 5.1 | | 1.6 | | 96 | | | | | 7.1 | 6.8 |
| 26 | | | | | | | 4.4 | | 1.7 | | 96 | | | | | 7.2 | 6.9 |
| 27 | | | | | | | 4.1 | | 1.7 | | 96 | | | | | 7.1 | 6.8 |
| 28 | | | | | | | 3.9 | | 1.7 | | 96 | | | | | 7.0 | 6.7 |
| 29 | | | | | | | 3.4 | | 1.8 | | 97 | | | | | 7.1 | 6.9 |
| 30 | | | | | | | 3.0 | | 1.7 | | 97 | | | | | 7.3 | 7.1 |
| 31 | | | | | | | 2.8 | | 1.8 | | 97 | | | | | 7.1 | 6.9 |
| 32 | | | | | | | 2.3 | | 1.8 | | 98 | | | | | 7.4 | 7.2 |
| 33 | | | | | | | 2.1 | | 1.9 | | 98 | | | | | 7.1 | 6.9 |
| 34 | | | | | | | 1.8 | | 1.9 | | 98 | | | | | 7.0 | 6.8 |
| 35 | | | | | | | 1.6 | | 1.9 | | 98 | | | | | 7.0 | 6.8 |
| 36 | | | | | | | 1.3 | | 1.8 | | 98 | | | | | 7.0 | 6.8 |
| 37 | | | | | | | 1.1 | | 1.8 | | 98 | | | | | 7.0 | 6.8 |
| 38 | | | | | | | <1 | | 1.7 | | 98 | | | | | 7.3 | 7.1 |
| 39 | | | | | | | | | 1.6 | | 98 | | | | | 7.1 | 6.9 |
| 40 | | | | | | | | | 1.5 | | 99 | | | | | 7.0 | 6.9 |
| 41 | | | | | | | | | 1.4 | | 98 | | | | | 7.0 | 6.8 |
| 42 | | | | | | | | | 1.2 | | 99 | | | | | 7.0 | 6.9 |
| 43 | | | | | | | | | 1.1 | | 99 | | | | | 7.0 | 6.9 |
| 44 | | | | 15 | | 10 | | 2.0K | >5.0K | | 99.3 | | | | | 7.0 | 6.9 |
| 45 | | 10 | | 15 | | 310 | | 2.0K | 5.0K | | 99.3 | | | | | 7.2 | 7.1 |
| 46 | | 15 | | 10 | | 5 | | 1.0K | 5.0K | | 99.4 | | | | | 7.1 | 7.0 |
| 47 | | 3 | | 3 | | 5 | | 750 | 3.5K | | 99.6 | | | | | 7.0 | 7.0 |
| 48 | | 3 | | 3 | | 30 | | 500 | 3.5K | | 99.6 | | | | | 6.9 | 6.9 |
| 49 | | 3 | | 3 | | 30 | | 500 | 2.0K | | 99.7 | | | | | 7.0 | 7.0 |
| 50 | | 1 | | 3 | | 10 | | 350 | 2.0K | | 99.8 | | | | | 6.8 | 6.8 |
| 51 | | 10 | | 5 | | 5 | | 150 | 1.5K | | 99.8 | | | | | 7.0 | 7.0 |
| 52 | | 10 | | 7 | | 10 | | 350 | | 500 | 99.7 | 3.5K | | | | 7.1 | 7.1 |
| 53 | | 10 | | 7 | | 10 | | 350 | | 500 | 99.7 | 3.5K | | | | 6.9 | 6.9 |
| 54 | | 30 | | 1 | | 5 | | 75 | | | 99.1 | 5.0K | | | | 6.6 | 6.5 |
| 55 | | 20 | | | | | | | | | 96 | 3.7 | <1 | | | 7.0 | 6.7 |
| 56 | | | | | | | | | | | 62 | 40 | 3.3 | <1 | | 8.4 | 5.2 |
| 57 | | | | | | | | | | | 13 | 32 | 9.6 | 52 | <1 | 9.3 | 1.2 |
| 58 | | | | | | | | | | | <1 | 3.2 | 2.7 | 86 | 21 | 10.1 | <0.1 |
| 59 | | | | | | | | | | | | <1 | <1 | 35 | 80 | 6.7 | |
| 60 | | | | | | | | | | | | | | 5.2 | 89 | 1.8 | |

EXAMPLE IV

In a manner substantially identical to that of Examples II and III, the feed columns were loaded with the yttrium-rare earth feed. Excess feed which was washed out of the feed columns prior to elution with the elutrient was analyzed. It was determined that the feed columns had absorbed 484 grams of yttrium-rare earth ions, measured as their oxides, M₂O₃. Thus, the feed columns contained 317 grams of yttrium, measured as Y₂O₃. Elution with the HEDTA solution described in Example II was carried out in the temperature range of 45°–50° C. The results of analysis of each fraction collected are presented in Table IV.

TABLE IV.—ANALYSIS OF FRACTIONS FROM EXAMPLE IV

| Fraction | Lu | Yb | Tm | Er | Ho | Dy | Tb | Gd | Eu | Sm | Y | Nd | Pr | Ce | La | Frac. Wt., g. | Wt., g. Y₂O₃ |
|---|---|---|---|---|---|---|---|---|---|---|---|---|---|---|---|---|---|
| 1 | 29 | 68 | 1.5 | 1.3 | | | | Int. | | | | | | | | 2.9 | |
| 2 | 24 | 70 | 3.4 | 2.2 | | | | | | | | | | | | 10.0 | |
| 3 | 18 | 54 | 9.6 | 14 | | | | | | | | | | | | 11.7 | |
| 4 | 10 | 25 | 15 | 44 | <1 | <1 | | | | | | | | | | 12.1 | |
| 5 | 3.8 | 6.8 | 14 | 70 | 4.0 | 2.5 | | | | | | | | | | 12.6 | |
| 6 | <1 | Int. | 6.9 | 74 | 11 | 11 | <1 | | | | | | | | | 12.4 | |
| 7 | | | Int. | 48 | 18 | 34 | 1.5 | <1 | | <1 | | | | | | 12.1 | <0.1 |
| 8 | | | | 18 | Int. | 59 | 4.7 | 2.3 | | 1.0 | | | | | | 12.3 | 0.1 |
| 9 | | | Int. | | | 67 | 8.9 | 8.0 | | 3.5 | <1 | | | | | 12.0 | 0.4 |
| 10 | | | | | | 56 | 11 | 19 | | 8.0 | 3.4 | | | | | 11.7 | 0.9 |
| 11 | | | | | | 35 | 11 | 31 | | 13 | 16 | | | | | 10.7 | 1.7 |
| 12 | | | | | | 11 | 5.5 | 30 | | 10 | 46 | | | | | 9.3 | 4.3 |
| 13 | | | | | | 2.5 | 2.0 | 17 | | 7.0 | 77 | | | | | 7.7 | 5.9 |
| 14 | | | | | | <1 | <1 | 5.2 | | 3.1 | 94 | | | | | 7.3 | 6.9 |
| 15 | | | | | | | | 1.4 | | 1.1 | 98 | | | | | 7.1 | 6.9 |
| 16 | | | | | | | | <1 | | <1 | 99 | | | | | 7.3 | 7.2 |
| 17 | | 35 | | 35 | | 10 | | 750 | | 2.0K | 99.7 | | | | | 6.9 | 6.9 |
| 18 | | 35 | | 50 | | 10 | | 500 | | 1.5K | 99.8 | | | | | 7.0 | 7.0 |
| 19 | | 35 | | 50 | | 30 | | 350 | | 1.0K | 99.95 | | | | | 7.0 | 7.0 |
| 20 | | 20 | | 35 | | 30 | | 200 | | 750 | 99.90 | | | | | 7.0 | 7.0 |
| 21 | | 20 | | 20 | | 30 | | 150 | | 500 | 99.93 | | | | | 7.1 | 7.1 |
| 22 | | 20 | | 35 | | 30 | | 100 | | 350 | 99.95 | | | | | 7.1 | 7.1 |
| 23 | | 15 | | 20 | | 10 | | 75 | | 150 | 99.97 | | | | | 6.8 | 6.8 |
| 24 | | 15 | | 10 | | 5 | 10 | 75 | | 350 | 99.95 | | | | | 7.2 | 7.2 |
| 25 | | 15 | | 5 | | 5 | 10 | 50 | | 350 | 99.96 | | | | | 7.0 | 7.0 |
| 26 | | 15 | | 35 | | 5 | | 50 | | 150 | 99.97 | | | | | 7.1 | 7.1 |
| 27 | | 15 | | 3 | | 5 | | 35 | | 100 | 99.98 | | | | | 7.0 | 7.0 |
| 28 | | 10 | | 3 | | 5 | | 35 | | 75 | 99.99 | | | | | 7.5 | 7.5 |
| 29 | | 10 | | 5 | | 5 | | 35 | | 75 | 99.99 | | | | | 7.0 | 7.0 |
| 30 | | 5 | | 5 | | 5 | | 35 | | | 99.99 | | | | | 7.2 | 7.2 |
| 31 | | 7 | | 3 | | 5 | | 20 | | | 99.99 | | | | | 7.1 | 7.1 |
| 32 | | 10 | | 10 | | 5 | | 20 | | 50 | 99.99 | | | | | 7.0 | 7.0 |
| 33 | | 5 | | 3 | | 5 | | 20 | | | 99.99 | | | | | 6.9 | 6.9 |
| 34 | | 7 | | 5 | | 5 | | 20 | | | 99.99 | | | | | 6.9 | 6.9 |
| 35 | | 10 | | 5 | | 5 | | | | | 99.99 | | | | | 7.0 | 7.0 |
| 36 | | 10 | | 15 | | 5 | | 20 | | | 99.99 | | | | | 7.0 | 7.0 |
| 37 | | 5 | | 1 | | 5 | | | | | 99.99 | | | | | 7.2 | 7.2 |
| 38 | | 5 | | | | 5 | | | | | 99.99 | | | | | 7.0 | 7.0 |
| 39 | | 5 | | | | 5 | | | | | 99.99 | | | | | 7.1 | 7.1 |
| 40 | | 5 | | 1 | | 5 | | | | | 99.99 | | | | | 6.9 | 6.9 |
| 41 | | 5 | | 1 | | 5 | | | | | 99.99 | | | | | 7.0 | 7.0 |
| 42 | | 5 | | 1 | | 5 | | | | | 99.99 | | | | | 6.9 | 6.9 |
| 43 | | 7 | | 3 | | 5 | | | | | 99.99 | | | | | 7.3 | 7.3 |
| 44 | | 5 | | 1 | | 5 | | | | | 99.99 | | | | | 7.1 | 7.1 |
| 45 | | 5 | | 1 | | 5 | | | | | 99.99 | | | | | 7.1 | 7.1 |
| 46 | | 5 | | 10 | | 5 | | | | | 99.99 | | | | | 6.9 | 6.9 |
| 47 | | 5 | | 1 | | 5 | | | | | 99.99 | | | | | 6.9 | 6.9 |
| 48 | | 5 | | 1 | | 1 | | | | | 99.99 | 75 | | | | 6.9 | 6.9 |
| 49 | | 3 | | 3 | | 5 | 20 | | 75 | 99.8 | 1.5K | | | | | 7.1 | 7.1 |
| 50 | | 3 | | 3 | | 5 | | 100 | | 99.8 | 1.5K | | | | | 7.0 | 7.0 |
| 51 | | 3 | | 3 | | 5 | | 100 | | 99.8 | 2.0K | | | | | 7.1 | 7.1 |
| 52 | | | | | | | | | | 99 | 1.2 | | | | | 7.2 | 7.1 |
| 53 | | | | | | | | | | 97 | 5.6 | <1 | <1 | | | 7.2 | 7.0 |
| 54 | | | | | | | | | | 82 | 22 | 1.4 | 1.6 | <1 | | 7.5 | 6.1 |
| 55 | | | | | | | | | | 49 | 37 | 6.0 | 16 | 1.4 | | 8.6 | 4.2 |
| 56 | | | | | | | | | | 11 | 16 | 7.0 | 55 | 13 | | 8.7 | 1.0 |
| 57 | | | | | | | | | | <1 | 1.4 | 1.9 | 73 | 29 | | 7.0 | <0.1 |
| 58 | | | | | | | | | | | | <1 | <1 | 53 | 49 | 4.9 | |
| 59 | | | | | | | | | | | | | | 24 | 70 | 3.0 | |

Comparison of the results given in Tables I–IV shows unexpected and surprising results which have great utility for obtaining high yields of high purity yttrium economically. At room temperature, elution of yttrium followed elution of samarium and preceded only slightly the elution of neodymium. Almost all of the fractions containing yttrium in significant amounts were contaminated with significant amounts of neodymium. When elution was carried out at 90°–95° C., yttrium was eluted in a position between terbium and gadolinium, much in advance of neodymium and other rare earth metals of atomic number 60 and less. Those skilled in the art will recognize that this discovery has great value. As for example, the ion exchange procedure of the prior art with elution at room temperature could be used to separate yttrium ions and ions of rare earth metals of atomic number 60 and less from rare earth metal ions of atomic number 62 and greater. The mixture of yttrium ions and rare earth metal ions of atomic number 60 and less is then subjected to the process of this invention with elution with HEDTA at a temperature in the range of about 32° to 95° C., whereby high yields of high purity yttrium are obtained. Alternatively, elution at 32°–95° C., according to this invention, is employed to obtain a mixture of yttrium ions and rare earth metal ions of atomic number 62 and greater, substantially free of rare earth metal ions of atomic number 60 and less. This mixture is then subjected to the ion exchange processes of the prior art with elution at room temperature to obtain separation of yttrium ions from the rare earth metal ions of atomic number 62 and greater. As still a third alternative, any method known to the art can be used to separate a mixture of yttrium ions and any of the rare earth metal ions of atomic number 60 and less from rare earth metal ions of atomic number 62 and greater and then, by means of this invention, yttrium ions are separated in high yield and high purity from its mixture with rare earth metal ions of atomic number 60 and less.

As still a fourth alternative manner of employing this invention, the feed solution is loaded on the feed columns and elution is carried out at room temperature until approximately the point at which rare earth metal ions of atomic number 62 and greater have been eluted. The temperature is then increased and elution is continued at the higher temperature in accordance with this invention. In this manner high yields of high purity yttrium ions can be obtained which are not obtainable by known methods.

An alternative way of practicing this invention is by carrying out the elution within the fairly narrow temperature range of 45°–50° C. This is the preferred temperature range at which elution is carried out when it is desired to separate, by means of only one elution sequence, yttrium ions from mixtures containing rare earth metal ions of atomic numbers 62 and greater and 60 and less. This manner of practicing the invention is described in detail in Example IV and Table IV.

It is evident from a study of Table IV that the process described in Example IV is suitable for obtaining a separation of yttrium ions in high yield and high purity from mixtures containing yttrium ions and any of the rare earth metal ions, especially neodymium. From the data in Example IV and Table IV it can be calculated that 96 percent of the total amount of yttrium present in the feed columns was recovered. Seventy-one percent of the recovered yttrium was of 99.9 percent or greater purity. Seventy-four percent of this was of 99.99 percent purity. Of the total amount of yttrium present in the feed columns, 50.4 percent was obtained in purity of 99.99 percent. These results are obtainable even though elution of the ions is carried through as little as one band length and with relatively rapid rates of flow. Thus this invention provides a distinct advantage over the prior art process wherein elution is carried out at the usual room temperatures and which does not produce an efficient and economic separation of yttrium ions.

Whereas this invention has been described and illustrated by specific examples, those skilled in the art will recognize that many modifications are possible without parting from the spirit and scope of the invention which is limited only by the following claims.

I claim:

1. In a process for the separation of yttrium metal ions from any of the rare earth metal ions having atomic numbers of 60 and less by providing for sorption of the mixture of the metal ions on the hydrogen form of cation exchange resin, then eluting the metal ions through and from cation exchange resin with an elutrient solution comprising an aqueous solution of hydroxyethylenediaminetriacetic acid and collecting successive fractions of the effluent liquid, the improvement which comprises eluting with an elutrient solution at a pH between about 4.0 and 8.0 while maintaining the ion exchange resin and the elutrient solution at elevated temperatures in the range of about 32° to 95° C. such that yttrium metal ions are eluted substantially in advance of neodymium.

2. The process of claim 1 wherein the aqueous solution of hydroxyethylethylenediaminetriacetic acid is about 0.0036 to 0.029 molar in said acid and is adjusted by the addition of ammonia to pH in the range of about 4.0 to about 8.0.

3. The process of claim 1 wherein the ion exchange resin is a sulfonated vinyl aromatic resin.

4. The process of claim 1 wherein any of the rare earth elements of atomic numbers 57 through 60 and 62 through 71 are present in the mixture and the ion exchange resin and the elutrient solution are maintained at elevated temperatures in the range of about 45° to 50° C. such that elution of yttrium ions occurs substantially midway between the point of elution of samarium ions and neodymium ions.

5. The process of claim 4 wherein the temperature of the ion exchange resin and the elutrient solution is maintained at between about 45° and 50° C.

6. The process of claim 5 wherein the elutrient solution comprises a 0.014 to 0.022 molar aqueous solution of hydroxyethylethylenediaminetriacetic acid, the pH of which solution is adjusted with ammonia to about 6.0 to 7.0.

7. The process of claim 6 wherein the elutrient solution is flowed through the cation exchange resin at a flow rate of about 2.0 to about 5.3 milliliters per square centimeter per minute.

8. The process of claim 7 wherein elution of the ions is carried through at least 1.0 band length.

9. The process of claim 1 wherein the cation exchange resin is a sulfonated styrene-divinylbenzene resin which is 8 percent cross-linked and which has a particle size of 30 to 40 mesh as determined by U.S. Standard sieve.

References Cited

UNITED STATES PATENTS

| | | | |
|---|---|---|---|
| 2,956,858 | 10/1960 | Spedding et al. | 23—22 |
| 3,033,646 | 5/1962 | Hansen | 23—23 |
| 3,037,841 | 6/1962 | Krumholz | 23—23 |
| 3,054,655 | 9/1962 | Krumholz et al. | 23—23 |

HERBERT T. CARTER, Primary Examiner

U.S. Cl. X.R.

23—24